United States Patent [19]

Hess et al.

[11] 3,904,440

[45] Sept. 9, 1975

[54] METHOD OF SEALING AN APERTURE IN A METALLIC SURFACE AND BATTERY EMPLOYING AN APERTURE SEAL

[75] Inventors: Heinrich J. Hess, Nidau, Switzerland; Gasper Pagnotta, Rexford, N.Y.

[73] Assignee: General Electric Company, Schenectady, N.Y.

[22] Filed: Feb. 27, 1974

[21] Appl. No.: 446,275

Related U.S. Application Data

[63] Continuation-in-part of Ser. No. 291,805, Sept. 25, 1972, abandoned.

[52] U.S. Cl. ............................................. 136/175
[51] Int. Cl. ......................................... H01m 35/18
[58] Field of Search................. 219/129, 128, 127; 136/175, 176; 220/24 R

[56] References Cited
UNITED STATES PATENTS

| | | | |
|---|---|---|---|
| 3,243,073 | 3/1966 | Gibson | 220/24 R |
| 3,426,170 | 2/1969 | Miller | 219/74 |
| 3,762,955 | 10/1973 | Dubin | 136/86 A |

*Primary Examiner*—John H. Mack
*Assistant Examiner*—H. A. Feeley
*Attorney, Agent, or Firm*—Paul R. Webb, II; Joseph T. Cohen; Jerome C. Squillaro

[57] ABSTRACT

A method of sealing an aperture in a metallic surface is disclosed which comprises providing a heat destructible, vapor leak tight barrier across and closing the aperture, providing a welding metal shape contacting the barrier adjacent at least the perimeter of the aperture, abrading away at least a portion of the barrier whereby contact is made between the welding metal shape and the perimeter of the aperture, and welding the metal shape thereby producing a seal in the aperture. This method is suitable for sealing the fill apertures in the reactant compartments of a battery. One type of such a battery is a primary sodium-halogen battery.

8 Claims, 5 Drawing Figures

PATENTED SEP 9 1975 3,904,440

METHOD OF SEALING AN APERTURE IN A METALLIC SURFACE AND BATTERY EMPLOYING AN APERTURE SEAL

This application is a continuation-in-part of application Ser. No. 291,805, filed Sept. 25, 1972, now abandoned, under the same title and in the same names.

This invention relates to a method of sealing an aperture in a metallic surface and to a battery employing an aperture seal and, more particularly, to such a method of sealing fill apertures in the reactant compartments of a battery, such as, a primary sodium-halogen battery.

Sodium sulfur cells, which operate at elevated temperatures, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium sulfur battery can be sodium beta-alumina.

A primary sodium-halogen battery is described and claimed in copending patent application Ser. No. 153,364, filed June 15, 1971 in the names of Stephan P. Mitoff and Fritz G. Will. This battery is assembled with a fill tube communicating with each of the reactant compartments. After each compartment is filled with its reactant through the fill tube, the tube is sealed by welding. Such tubes can also be pinched closed.

In Gibson U.S. Pat. No. 3,243,073, there is described a spot welded ball seal. In column 2, lines 10–26, it is set forth that the vessel wall is counterbored to form a recess having a larger diameter than the sealing ball. A filling hole is made in the wall. Filling material such as a gas or liquid is inserted into the vessel. The steel ball is butted against the hole. A welding electrode is butted against the ball and the other electrode is butted against the vessel wall. The electrodes are energized thereby effecting a weld and a hermetic seal between the wall and the ball. The counterbored hole serves a dual purpose in that it provides a protective rim around the ball which prevents the ball from being accidentally knocked off and which rim acts as a leverage point to pry the ball off if it is necessary to open and refill the vessel. A tamper proof and protected seal may be made by placing a suitable sealing compound in the counterbored hole after the spot welding operation.

In Miller U.S. Pat. No. 3,426,170, there is described a hermetic sealing process. In column 2, lines 15–25, it is set forth that an aperture in a thin-walled container having a corrosive liquid therein subject to formation of gases and pressure upon application of heat thereto is hermetically sealed by contacting the container surrounding the aperture with a metal body having a lower melting temperature than the container and applying energy thereto in an amount, at a rate, and for a period of time sufficient to cause the body and the contacting container to alloy and, upon removal of the applied energy, solidify to hermetically seal the container. The metal body is further described in column 3, lines 8–25, that it can be in a number of different shapes, such as spherical, prior to welding. Subsequent to the welding the shape is changed to a sealing alloy which is substantially flush with the outer surface of the thin wall container.

Our present invention is directed to an improved method of sealing an aperture in a metallic surface and to a battery having at least one seal with one or more wires extending therefrom.

As opposed to the above prior art patents, our improved method of sealing an aperture in a metallic surface employs the unique steps of providing a heat destructible, vapor leak-tight barrier across and closing the aperture, providing a welding metal shape contacting the barrier adjacent at least the perimeter of the aperture, and abrading away at least a portion of the barrier whereby contact is made between the welding metal shape and the perimeter of the aperture. Our improved method, as opposed to the above prior art patents, allows the metal shape to be welded in a metallurgically clean welding area and welding atmosphere. Further, our battery has an improved welding shape seal with at least one wire extending therefrom. Such wire can extend inwardly to provide a current collector, can extend outwardly to provide an electrical lead, or can extend in both directions to provide both a current collector and an electrical lead.

The primary object of our invention is to provide a room atmosphere method of sealing the fill apertures in battery reactant compartments in the presence of widespread local contamination resulting in a leak tight primary sodium-halogen battery.

In accordance with one aspect of our invention, a method of sealing an aperture in a metallic surface comprises providing a heat destructible, vapor leak-tight barrier across and closing the aperture, providing a welding metal shape contacting the barrier adjacent at least the perimeter of the aperture and extending through the aperture, abrading away at least a portion of the barrier whereby contact is made between the welding metal shape and the perimeter of the aperture, and spot welding the metal thereby producing a seal in the aperture.

These and various other objects, features and advantages of the invention will be better understood from the following description taken in connection with the accompanying drawing in which.

Figure 1:
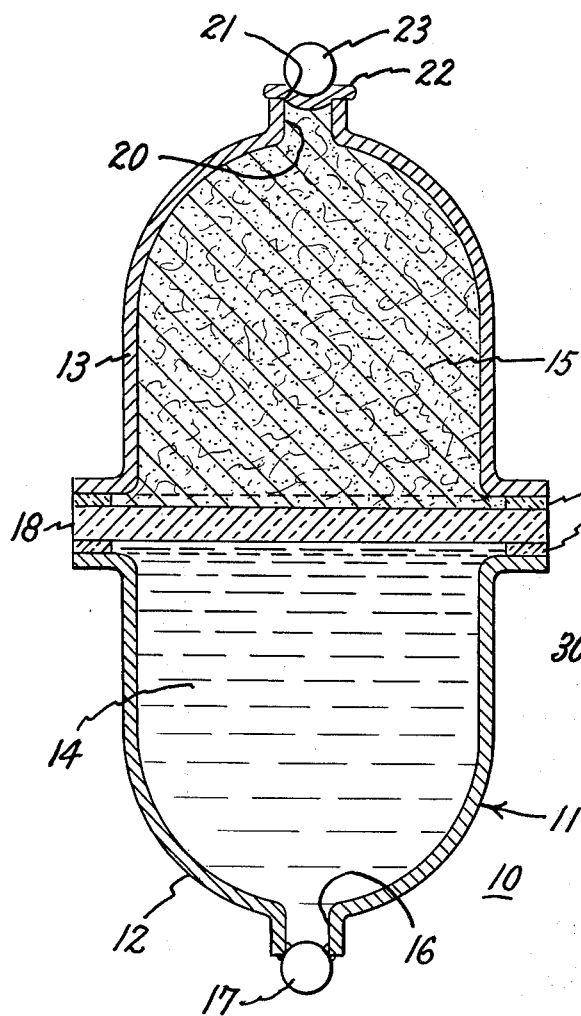
FIG. 1 is a sectional view of a battery with one of its fill apertures sealed in accordance with our invention and with its other fill aperture to be sealed in accordance with our invention.

In FIG. 1 of the drawing, there is shown generally at 10 a primary sodium-bromine battery which has a metallic casing 11 including an anode portion 12 and a cathode portion 13. An anode 14 of sodium as an amalgam is shown positioned within anode portion 12. A bromine in conductive material cathode 15 is positioned within cathode portion 13. Anode portion 12 has an outwardly swaged fill aperture 16 sealed with a metal shape ball seal 17 in accordance with the method of our invention.

A solid sodium ion-conductive electrolyte 18 is shown positioned between and adjacent anode 14 and cathode 15. Electrolyte 18 is secured on opposite sides to portions 12 and 13 by identical glass seals 19. Cathode portion 15 has an outwardly swaged fill aperture 20 with the perimeter of the aperture shown at 21.

A heat destructible, vapor tight barrier 22 is shown across and closing the end of aperture 20. This barrier 22, which is preferably made of paraffin wax contacts securely perimeter 21 of aperture 20, closes aperture 20, and extends within aperture 20. A welding metal shape 23 in the preferred form of a ball contacts barrier 22 adjacent perimeter 21 of aperture 20. Since barrier 22 extends within aperture 20, welding metal shape 23 extends initially also within aperture 20 and in additional contact with barrier 22.

Figure 2:
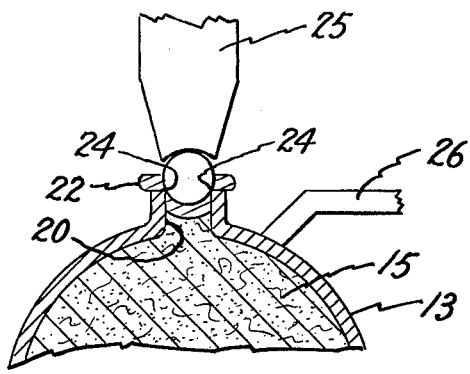
FIG. 2 is a sectional view of the upper portion of the battery shown in FIG. 1 prior to the fill aperture being sealed in accordance with our invention.

In FIG. 2, there is shown the upper portion of the battery shown in FIG. 1 of the drawing. A portion of barrier 22 has been abraded away at 24 whereby welding metal shape 23 is in metal to metal contact with metallic aperture 21 of cathode portion 13. A portion of welding electrode 25 is shown whereby the tip of the electrode is in contact with shape 23. A portion of ground and chill connection 26 for electrode 25 is shown positioned in contact with cathode portion 13 adjacent aperture 20.

Figure 3:
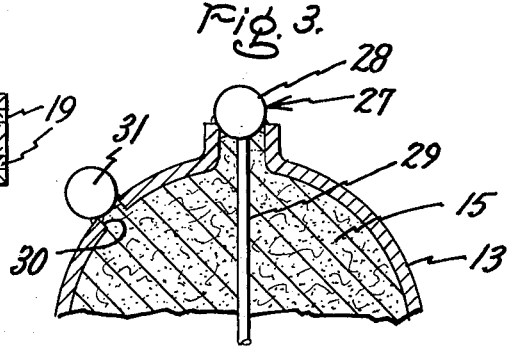
FIG. 3 is a partial sectional view of a battery with a modified seal in the aperture.

In FIG. 3 of the drawing, there is shown a partial sectional view of battery 10 including partially cathode portion 13 of casing 11, and a bromine in conductive material cathode 15. A modified welding metal shape 27 includes a ball 28 contacting at least perimeter 21 of aperture 20 and extends through aperture 20. Metal shape 27 includes also a wire 29 extending inwardly from ball 28 providing a current collector in the reactant compartment. An air escape aperture 30 is provided in portion 13 of casing 11. This aperture 30 is sealed with a welding metal shape 31 similar to shape 23. The opposite anode portion 12 (not shown) is provided with a similar metal shape, an air escape aperture, and a metal shape for the air escape aperture.

Figure 4:
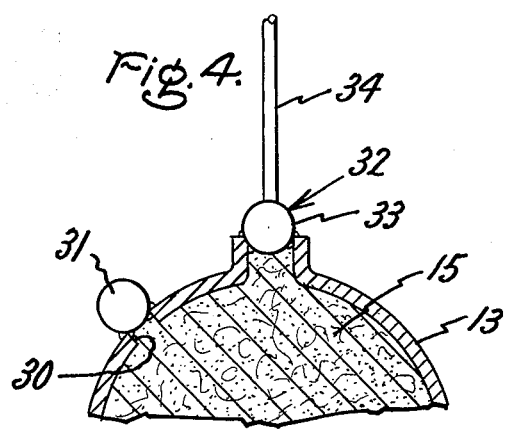
FIG. 4 is a partial sectional view of a battery with a further modified seal in the aperture.

In FIG. 4 of the drawing, there is shown a partial sectional view of battery 10 including partially cathode portion 13 of casing 11 and a bromine in conductive material cathode 15. A further modified welding metal shape 32 includes a ball 33 contacting at least perimeter 21 of aperture 20 and extends through aperture 20. Metal shape 32 includes also a wire 34 extending outwardly from ball 33 providing an electrical lead. An air escape aperture 30 is provided in portion 13 of casing 11. This aperture 30 is sealed with a welding metal shape 31 similar to shape 23. The opposite anode portion 12, not shown, is provided with a similar metal shape, an air escape aperture and a metal shape for the metal air escape aperture.

Figure 5:
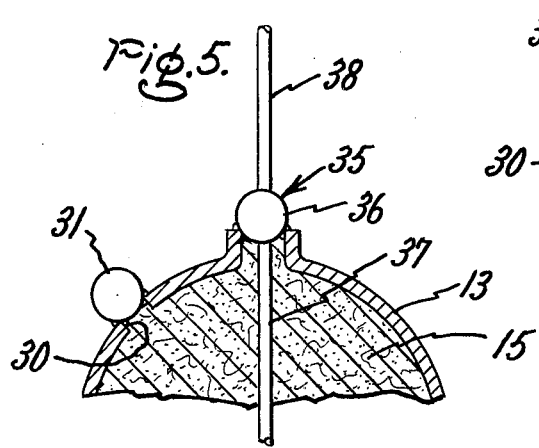
FIG. 5 is a partial sectional view of a battery with a still further modified seal in the aperture.

In FIG. 5 of the drawing, there is shown a partial sectional view of battery 10 including partially cathode portion 13 of casing 11 and a bromine in conductive material with cathode 15. A still further modified welding metal shape 35 includes a ball 36 contacting at least perimeter 21 of aperture 20 and extends through aperture 20. Metal shape 35 includes a wire 37 extending inwardly and a wire 38 extending outwardly from ball 36. The inwardly extending wire 37 provides a current collector in the reactant compartment. The outwardly extending lead 38 provides an electrical lead. An air escape aperture 30 is provided in portion 13 of casing 11. This aperture 30 is sealed with a welding metal shape 31 similar to shape 23. The opposite anode portion 12, not shown, is provided with a similar metal shape, an air escape aperture and a metal shape for the air escape.

We found that we could seal the fill apertures in a variety of batteries. One type of such battery is a primary sodium-bromine battery as discussed in the above-mentioned copending application Ser. No. 153,364, with a metallic casing, an anode within the casing, the anode selected from the class consisting of sodium, sodium as an amalgam and sodium in a non-aqueous organic electrolyte, a solid sodium ion-conductive electrolyte adjacent the anode, and a bromine in conductive material cathode adjacent the opposite side of the electrolyte.

A unique method of hermetically sealing the anode and cathode portions of the above casing to opposite sides of the solid electrolyte is described and claimed in copending patent application Ser. No. 148,793, filed June 1, 1971, under the title "Method of Forming A Metallic Battery Casing" in the name of Stephan P. Mitoff. This copending application is assigned to the same assignee as the present application.

The anode portion can be filled with sodium, sodium as an amalgam or sodium in a non-aqueous organic electrolyte through aperture 16 after which the aperture is sealed in accordance with our method. The cathode portion is filled with bromine and, when required, with bromine and electrolyte through aperture 20, after which the aperture is similarly sealed in accordance with our method. Leads are attached in accordance with our invention or are attached to the respective casing portions for operation of the battery. The battery is discharged by applying a load across the anode and cathode leads.

We found that we could seal the fill apertures 16 and 20 which are associated with reactant compartments or portions 12 and 13 by our method. After each compartment is filled successively with its respective reactant, a heat destructible, vapor tight barrier is placed across and closes the aperture. A welding metal shape is positioned in contact with the barrier adjacent at least the perimeter of the aperture. At least a portion of the barrier is abraded away whereby contact is made between the welding metal shape and the perimeter of the aperture. A preferred manner to accomplish this abrading is to push or press the welding metal shape against the barrier and to rotate the welding metal shape against the barrier until at least a portion of the barrier is removed or abraded away whereby there is direct metallic and electrical contact between the welding metal shape and at least a portion of the perimeter or wall of the aperture.

In this unique combination, a seal is provided throughout the sealing method. Initially, a heat destructible, vapor leak-tight barrier is provided across and closes the aperture. The welding metal shape positioned in contact with at least a portion of the perimeter or wall of the aperture and the barrier provides a seal. Finally, the welding step results in a hermetic seal. The resulting structure is a hermetically sealed, primary sodium-bromine battery.

We found that the welding metal shape should, when positioned initially, contact the barrier adjacent at least the perimeter of the aperture. While a ball or sphere shape is preferred for an annular aperture, many other configurations including an ellipse, cone and cylinder can be employed for an annular aperture. While an annular aperture would normally be employed, it is possible to provide other aperture configurations. For example, a star, diamond or triangular aperture might be used. In such an event, the welding metal shape is formed to the same configuration as the aperture.

We found further that the aperture can be unswaged or swaged inwardly or outwardly. We found it desirable to provide a second air escape aperture in each reactant compartment, which air escape aperture is sealed with a seal in accordance with our method. Further, our method can be modified to produce a seal with a wire extending outwardly, inwardly or in both directions therefrom. When the wire extends outwardly, it provides an electrical lead or it can be removed. When the wire extends inwardly, it provides a current collector in the reactant compartment. When the wire extends in both directions, an electrical lead and a current collector are provided. The resulting structure is a unique, hermetically sealed battery.

We found further that providing initially a heat destructible, vapor leak-tight barrier across and closing the aperture of the reactant compartments of a battery prior to welding produced a leak-tight seal which protects the battery reactants against reaction with vapors of oxygen, water, and carbon dioxide. These barrier sealed compartments allow the battery to be handled and welded in room atmosphere, a unique advantage. We found further that we could cover at least the periphery of the aperture with a heat destructible layer prior to filling each compartment with reactant thereby providing a subsequent metallurgically clean weld area. After each compartment is filled with its respective reactant, a heat destructible vapor leak-tight barrier is placed across and closes the aperture prior to welding. It will be appreciated that the heat destructible layer and the heat destructible, vapor leak-tight barrier can be of identical or different materials. Such barrier must be heat destructible during the welding step to provide a strong weld. Such barrier must be vapor leak tight to protect the battery reactants and to provide for room atmosphere welding. Suitable barrier materials and heat destructible layer materials include waxes, low melting vapor resistant polymers, vapor resistant treated papers, adhesive tape, vapor resistant tapes, etc. of the vapor materials, we prefer paraffin wax.

Examples of methods of sealing hermetically an aperture in a metallic surface, examples of metallic surfaces with hermetically sealed apertures, and examples of batteries with hermetically sealed apertures in accordance with our invention are set forth below:

EXAMPLE I

Ten 0.010 inch thick tantalum sheets and ten 0.025 inch tantalum sheets were each provided with an aperture which had a diameter of 0.030 inch. Paraffin wax employed as the heat destructible, vapor tight barrier which was placed across and closed each aperture. A welding metal shape was provided in the form of 0.040 inch diameter tantalum ball at the end of a 0.025 inch diameter tantalum wire. Each tantalum ball was placed in contact with the barrier adjacent the perimeter of each aperture. The wire extended outwardly from the ball and the aperture. A portion of each barrier was abraded away by pressing each ball against each barrier and rotating each ball against each barrier until a portion of each barrier was removed thereby providing direct metallic and electrical contact between each ball and a portion of the perimeter of each aperture. Each ball was spot welded into a ball seal in the aperture by contacting a welding electrode with the tantalum wire for a one millisecond pulse using 50 watt seconds of power. This method resulted in 20 helium-leak tight, metallurgically perfect ball seals in the associated sheets.

EXAMPLE II

A battery was assembled generally in accordance with the above description and with FIGS. 1 and 2 of the drawing wherein a metallic casing having two casing portions of 10 mil thick tantalum was provided. Each casing portion was in the form of a cup with a lip and an aperture in the closed surface. A solid sodium ion-conductive electrolyte was provided in the form of a disc of sodium beta-alumina. Two glass rings each with approximately the inside and outside diameter of the cup lip were cut from Kimble N–51A glass tubing. The electrolyte disc, glass rings, and lips of both portions were stacked together and fired by R.F. induction heating at 1050°C for a period of 2 minutes inside a graphite crucible using an argon atmosphere. The resulting seal was tested and found to be helium leak-tight.

The anode portion was then filled through its associated aperture with sodium as an amalgam containing about 90 weight percent sodium and about 10 weight percent mercury. The aperture was sealed by first providing a heat destructible, vapor leak-tight barrier of paraffin wax across the aperture and by providing a welding metal shape in the form of a ball which contacted the barrier adjacent the perimeter of the aperture. A portion of the barrier was abraded away by pressing the ball against the barrier and by rotating the ball against the barrier until a portion of the barrier was removed thereby providing direct metallic and electrical contact between each ball and a portion of the perimeter of the aperture. The ball was spot welded into a hermetic ball seal in the aperture by contacting a welding electrode on the ball for a 4 millisecond pulse using 40 watt seconds of power. Bromine was then added through the other aperture to provide the cathode portion with bromine in the conductive material. The aperture was sealed by first providing a heat destructible, vapor leak-tight barrier of paraffin wax across the aperture and by providing a welding metal shape in the form of a ball which contacted the barrier adjacent the perimeter of the aperture. A portion of the barrier was abraded away by pressing the ball against the barrier and by rotating the ball against the barrier until a portion of the barrier was removed thereby providing direct metallic and electrical contact between each ball and a portion of the perimeter of the aperture. The ball was spot welded into a hermetic ball seal in the aperture by contacting a welding electrode on the ball for a 4 millisecond pulse using 40 watt seconds of power. The resulting device was a sealed primary sodium-bromine battery.

EXAMPLE III

The battery of Example I showed an open circuit voltage of 3.5 volts. At room temperature this battery exhibited the following polarization behavior which is shown in Table I.

TABLE I

| Current Density Microamperes/cm² | Potential Volts |
| --- | --- |
| 10 | 3.35 |
| 25 | 3.18 |
| 50 | 3.02 |
| 100 | 2.79 |
| 200 | 2.46 |
| 500 | 1.7 |

While other modifications of the invention and variations thereof, which may be employed within the scope of the invention have not been described, the invention is intended to include such as may be embraced within the following claims:

What we claim as new and desire to secure by Letters Patent of the United States is:

1. A method of sealing hermetically an aperture in a metallic surface which comprises providing a heat destructible, vapor leak-tight barrier across and closing the aperture, providing a welding metal shape contacting the barrier adjacent at least the perimeter of the aperture, abrading away at least a portion of the barrier whereby metallic and electrical contact is made between the welding metal shape and at least a portion of the perimeter of the aperture, and spot welding the metal shape thereby producing a hermetic seal in the aperture.

2. A method of sealing hermetically an aperture in a metallic surface as in claim 1, wherein the welding metal shape has a wire extending therefrom thereby producing after welding a hermetic seal in the aperture with a wire affixed to and extending outwardly from the seal.

3. A method of sealing hermetically an aperture in a metallic surface as in claim 1, wherein the welding metal shape has a wire extending therefrom and through the aperture thereby producing after welding a hermetic seal in the aperture with a wire affixed to and extending inwardly from the seal.

4. A method of sealing hermetically an aperture in a metallic surface as in claim 1, wherein the welding metal shape has a pair of wires extending therefrom in opposite directions thereby producing after welding a hermetic seal in the aperture with one wire affixed to and extending outwardly from the seal and with one wire affixed to and extending inwardly from the seal.

5. A method of sealing hermetically the fill aperture in each metallic reactant compartment of a battery which somprises filling successively each metallic reactant compartment of the battery through its fill aperture with its respective reactant, providing successively a heat destructible, vapor leak-tight barrier across and closing the apertures, providing a welding metal shape contacting the barrier adjacent at least the perimeter of each aperture after filling the associated reactant compartment, abrading away at least a portion of each barrier whereby metallic and electrical contact is made between each welding metal shape and at least a portion of the perimeter of each aperture, and spot welding successively each metal shape thereby producing a hermetic seal in each aperture.

6. A method of sealing hermetically the fill aperture as in claim 5, wherein each welding metal shape has a wire extending therefrom thereby producing after successive weldings a hermetic seal in each aperture with a wire affixed to and extending outwardly from the seal.

7. A method of sealing hermetically the fill aperture as in claim 5, wherein each welding metal shape has a wire extending therefrom and through each aperture thereby producing after successive weldings a hermetic seal in each aperture with a wire affixed to and extending inwardly from the seal.

8. A method of sealing hermetically the fill aperture as in claim 5, wherein each welding metal has a pair of wires extending therefrom in opposite directions thereby producing after successive weldings a hermetic seal in each aperture with one wire affixed to and extending outwardly from the seal and with one wire affixed to and extending inwardly from the seal.

* * * * *